3,188,119
PARALLEL PIPE-TO-PLATE SWIVEL CONNECTOR

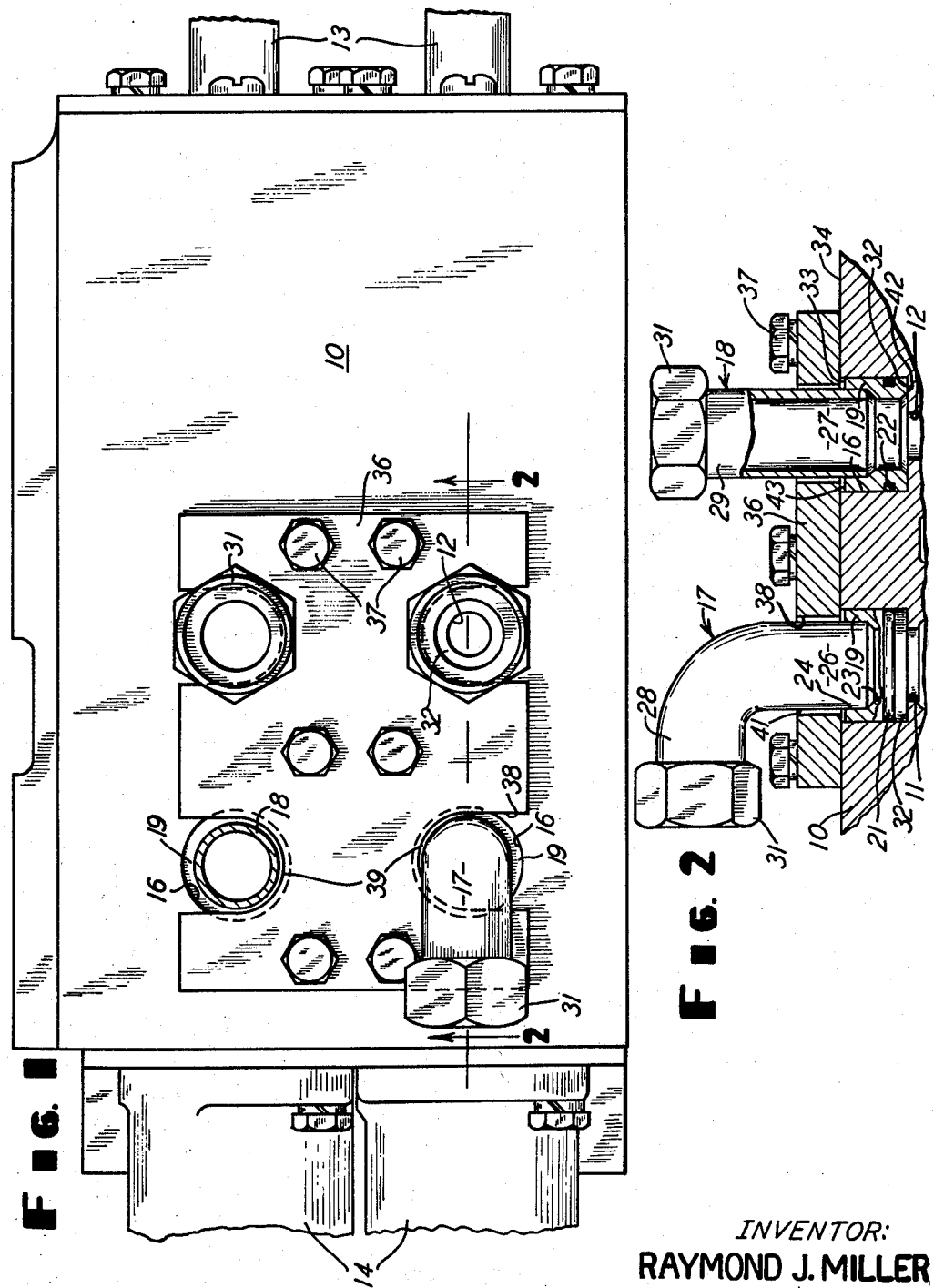

Raymond J. Miller, Racine, Wis., assignor to J. I. Case Company, Racine, Wis., a corporation of Wisconsin
Filed Oct. 29, 1963, Ser. No. 319,739
1 Claim. (Cl. 285—136)

This invention relates to an adjustable connector for fluid lines such as pipes and fittings connected to a valve body or the like.

In certain hydraulic arrangements involving connecting fittings or fluid lines, there is a requirement for adjusting or moving the fitting or pipe so that it can be directed in an orientation required. Thus it is desired to provide a hydraulic construction consisting of a valve body and connecting pipes such that the pipes may be fluid-tightly connected to the valve body but yet can be rotated or adjusted in their outlet direction, and this is accordingly a prime object of this invention. It is a further concern of this invention to provide the necessary means and construction so that the connecting pipes can be provided in plurality and yet all be readily fluid tightly connected to the main body or valve while of course the pipes are adjustable in their orientation of the extending ends thereof.

Another object of this invention is to provide an adjustable connector for fluid lines wherein the arrangement is simple and inexpensive in both manufacture and assembly, and which is also convenient for necessary disassembly and maintenance.

Still another object of this invention is to provide a means for connecting a hydraulic fitting with a body having fluid passageways therein and with the fitting being adjustable in its orientation with respect to the body both before and after final assembly of the components mentioned. Thus in accomplishing this particular object, the fitting may be rotated to a desired direction with respect to the extending end thereof so that the fitting end can be connected to additional fluid lines as desired, even though the fitting is already finally assembled in a fluid-tight manner with respect to the body.

Still a further object of this invention is to provide a construction of a fluid-conducting body and a plurality of fittings in fluid-flow communication with the body and with the fittings being adjustably secured to the body by a convenient and simplified member which can be utilized to secure all of the fittings to the body and thus there is required only the means for holding the single member to the body in accomplishing the securing of the numerous fittings to the body.

Other objects and advantages will become apparent upon reading the following description in light of the accompanying drawings, wherein:

FIG. 1 is a top plan view of a preferred embodiment of this invention with parts thereof broken away.

FIG. 2 is a sectional view of a fragment of the embodiment shown in FIG. 1 taken on the line 2—2 of FIG. 1.

A valve body or the like 10 is shown to have fluid-flow passageways 11 and 12 extending therein, and necessary and ordinary connections 13 and 14 are also provided for flow of fluid through the body 10 in a desired and well-known manner. The body 10 also has circular openings or counterbores 16 in fluid-flow communication with the passageways 11 and 12 respectively, and these counterbores receive the fittings hereinafter described.

Fittings or fluid lines 17 and 18 have enlarged circular portions 19 welded, soldered or otherwise fluid tightly secured to the lower ends of the fittings so that the portions 19 are disposed within the body openings 16. Of course it will be understood that the openings 16 are circular and the portions 19 are also circular so that the portions 19 can be rotated within the bores or openings 16. Conventional type of fluid-sealing O-rings 21 are disposed in grooves 22 extending around the fitting ends 19 for the usual fluid sealing of the portion 19 with the body bores 16. Of course it will also be noted that the portion 19 has a lower fluid passageway 23 for fluid-flow communication with the passageways 11 and 12 respectively. Also the enlarged portion 19 has an upper circular opening 24 which fluid tightly receives lower ends of the fittings 17 and 18, and these lower ends are designated 26 and 27 respectively.

It will further be seen and understood that the upper ends 28 and 29 of the fittings 17 and 18 respectively have threaded connectors 31 attached thereto for the usual and conventional purpose of connecting to fluid lines not shown herein.

The body bores 16 present shoulders 32 for abutment with the fitting ends 19 and of course axial location of the fittings 17 and 18 with respect to the inward direction of the fitting in the valve body 10. Also it will be noted that the portions 19 are slightly shorter in length than the length of the counterbores 16, and thus the portions 19 in their upper surfaces 33 do not extend to the upper surface 34 of the valve body 10 when the fittings are seated in the bores 16 as shown. This clearance as indicated in the drawing will be hereinafter described.

A hold down or connector plate 36 is secured to the body 10 by means of a plurality of screws 37 extending through the plate 36 as shown. In the arrangement shown, the plate 36 has four notches 38 extending inwardly from the plate edges to present arcuate edges indicated 39 on the interior of the plate 36. The radius of the edges 39 is less than the radius of the enlarged end 19 and thus the plate 36 overlaps the enlarged end 19 and therefore secures the fittings 17 and 18 in the assembled position shown. However the notches 38 are slightly larger than the diameters of the various fittings and thus there is a clearance designated 41 between the plate 36 and the fittings 17 and 18.

With the arrangement shown and described, and particularly with reference to an elbow-type fitting such as the fitting 17, it will now be appreciated that the construction can be entirely assembled with the screws 37 tight to secure the plate 36 as shown. Then at this point the fitting 17 can still be rotated to a desired position for directing the extending end 28 of the fitting as preferred. Thus the fitting enlarged end 19 simply rotates in the bore 16, and the clearance 33 between the end 19 and the plate 36 permits the rotation mentioned. Of course also the clearance 41 between the plate 36 and the fitting 17 permits this rotation. However, even though the fittings can be adjustably or rotatably positioned after assembly, they are nevertheless securely retained in the assembled position within the valve body 10 by means of the plate 36 which precludes removal or axial movement of the fittings 17 and 18 to an extent they would be no longer fluid tightly sealing in the bores 16. Also, only the single plate 36 is required for the plurality of fittings shown, namely all four of the fittings, and the notched arrangement of the plate 36 permits the plate to be placed into its assembled position even after all of the fittings have been placed in their assembled positions.

Thus the fittings have shoulder portions 42 and 43 on their lower and upper ends respectively of the enlargement 19, and these shoulders are transverse to the axis of the required for the plurality of fittings shown, namely all ders 42 and 43 and is effective in the prevention of the escape of fluid in the direction parallel to the axis of the fitting.

While a specific embodiment of this invention has been shown and described, it should be obvious that certain changes could be made in the embodiment, and the invention should therefore be limited only by the scope of the appended claim.

What is claimed is:

An adjustable connector for a fluid line comprising a body with a flat surface and having at least three circular bores extending through said surface and with the axes of said bores being so placed that at least one of said bores is in a plane different from any two of the other of said bores, each of said bores having a counterbore defining a shoulder facing outwardly toward said surface, a plurality of fittings each having an enlarged circular portion thereon disposed in each of said counterbores, said circular portions being adapted to abut said shoulders to limit movement of said fittings toward the interior of said body, sealing means carried by one of said enlarged circular portion and the wall defining said counterbore to engage and seal between the wall of said counterbore and said enlarged circular portion, said enlarged portions being rotatably and entirely disposed with axial clearance within the axial limits of said counterbores, said fittings extending outward from said counterbores and beyond said flat surface and with the outer diameter of said extending portion being reduced with respect to the diameter of said enlarged portion and having an enlarged end on the extending end of each of said reduced portions, and a flat retaining plate removably attached to said body and extending along said flat surface and between said fittings and having a half-circle notch in each of the opposite edges thereof to extend in a half-circle adjacent each of said reduced portions and with said plate being spaced from said reduced portions and overlapping said enlarged circular portions in the half-circle walls defining said notches for securing said fittings to said body in the direction of the axes of said bores, the distance between the bottom of one of said notches in one plane to the bottom of another of said notches in the other plane defining the said swivel clearance between said fittings and said retaining plate.

References Cited by the Examiner

UNITED STATES PATENTS

| | | | |
|---|---|---|---|
| 860,445 | 7/07 | Cheney | 285—281 X |
| 1,518,368 | 12/24 | Steed | 285—98 |
| 2,826,436 | 3/58 | Hupp | 285—211 X |
| 2,835,305 | 5/58 | Boyer | 285—190 X |
| 3,093,397 | 6/61 | Yancey | 285—211 X |
| 3,051,510 | 8/62 | Dawes | 285—189 X |

FOREIGN PATENTS

| | | |
|---|---|---|
| 1,183,872 | 2/59 | France. |
| 174,426 | 1/22 | Great Britain. |
| 366,223 | 2/32 | Great Britain. |

CARL W. TOMLIN, *Primary Examiner.*